United States Patent
Qi et al.

(10) Patent No.: US 10,379,906 B2
(45) Date of Patent: Aug. 13, 2019

(54) METHOD AND APPARATUS FOR SYSTEM CALL COMMAND BATCH PROCESSING

(71) Applicant: HUAWEI TECHNOLOGIES CO., LTD., Shenzhen, Guangdong (CN)

(72) Inventors: Kai Qi, Shenzhen (CN); Wei Wang, Hangzhou (CN); Yi Cai, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 15/590,542

(22) Filed: May 9, 2017

(65) Prior Publication Data

US 2017/0242733 A1 Aug. 24, 2017

Related U.S. Application Data (63) Continuation of application No. PCT/CN2014/090727, filed on Nov. 10, 2014.

(51) Int. Cl.
| | | |
|---|---|---|
| *G06F 9/46* | (2006.01) | |
| *G06F 9/50* | (2006.01) | |
| *G06F 9/44* | (2018.01) | |
| *G06F 9/38* | (2018.01) | |
| *G06F 9/48* | (2006.01) | |

(52) U.S. Cl.
CPC .......... *G06F 9/5038* (2013.01); *G06F 9/3851* (2013.01); *G06F 9/44* (2013.01); *G06F 9/4806* (2013.01); *G06F 9/4843* (2013.01); *G06F 9/5005* (2013.01); *G06F 9/5033* (2013.01); *G06F 9/5066* (2013.01); *G06F 9/46* (2013.01); *G06F 9/466* (2013.01); *G06F 9/50* (2013.01)

(58) Field of Classification Search
None
See application file for complete search history.

(56) References Cited

U.S. PATENT DOCUMENTS

| | | | |
|---|---|---|---|
| 5,511,220 A | 4/1996 | Perlman | |
| 8,103,785 B2 | 1/2012 | Crowley et al. | |
| 8,886,917 B1 * | 11/2014 | Binkert | G06F 9/50 |
| | | | 712/32 |
| 2009/0126006 A1 | 5/2009 | Zhang et al. | |
| 2010/0161976 A1 | 6/2010 | Bacher | |

(Continued)

FOREIGN PATENT DOCUMENTS

| | | |
|---|---|---|
| CN | 101196816 B | 12/2010 |
| CN | 102609306 A | 7/2012 |
| CN | 102902657 A | 1/2013 |

(Continued)

OTHER PUBLICATIONS

International Search Report dated Aug. 14, 2015 in corresponding International Application No. PCT/CN2014/090727.

(Continued)

*Primary Examiner* — Wissam Rashid
(74) *Attorney, Agent, or Firm* — Staas & Halsey LLP (57) ABSTRACT

A method and apparatus for system call command batch processing are provided. The method enable system call commands of a same type to be processed in a same CPU core according to a sequence of entering a kernel, thereby ensuring that returned results of the system call commands are sequential.

12 Claims, 4 Drawing Sheets

(56) References Cited

U.S. PATENT DOCUMENTS

2010/0287360 A1 11/2010 Maruyama
2014/0344825 A1 11/2014 Suzuki

FOREIGN PATENT DOCUMENTS

| CN | 104063303 A | 9/2014 |
|---|---|---|
| WO | 2008/023426 A1 | 2/2008 |
| WO | 2013/094156 A1 | 6/2013 |

OTHER PUBLICATIONS

Chinese Office Action dated Jun. 27, 2018 in corresponding Chinese Patent Application No. 201480045111.2, 6 pgs.
International Search Report dated Aug. 14, 2015 in corresponding International Patent Application No. PCT/CN2014/090727.
Extended European Search Report dated Nov. 2, 2017 in corresponding European Patent Application No. 14905888.5.

* cited by examiner

METHOD AND APPARATUS FOR SYSTEM CALL COMMAND BATCH PROCESSING

CROSS-REFERENCE TO RELATED APPLICATIONS

This application is a continuation of International Application No. PCT/CN2014/090727, filed on Nov. 10, 2014, the disclosure of which is hereby incorporated by reference in its entirety.

TECHNICAL FIELD

The present disclosure relates to the computer field, and in particular, to a method and apparatus for system call command batch processing.

BACKGROUND

To ensure security of an operating system kernel, a user program can obtain, using a system call command, a service provided by the operating system, kernel. For example, the user program can open a file, close as file, or read/write a file using a system call command related to a file system. A request of the user program is completed in the kernel using the system call command, and a processing result is returned to the user program. A kernel refers to system software providing functions such as a hardware abstraction layer disk and file system control, and multitasking.

Because frequent context switches exist in a conventional Linux system, overheads for calling the context switches by the system are relatively large and system work efficiency is low. To resolve the call problem of the conventional Linux system, a method for system call command batch processing is put forward in the prior art. The overheads for calling the context switches by the system include overheads for saving, an operating environment of a current task and restoring an operating environment of a to-be-operated task. One system call task includes multiple system call commands. Specifically, a cache table for system call command batch processing is set in a kernel, multiple system call commands are distributed to different CPU cores according to a sequence of entering the kernel and are concurrently executed, and processing results are returned to a user program, so that context switch overheads caused by a conventional system call can be saved.

However, when multiple system call commands are distributed, for processing, to different CPU cores using the method for system call command batch processing put forward in the prior art, because system call commands of one system call task may be distributed to different CPU cores fur processing, returned results of the system call task may be non-sequential. For example, multiple system call commands of one system call task enter a kernel in a sequence of system call command 1, system call command 2, and system call command 3. An operating system randomly schedules the three system call commands to three CPU cores for processing. Because the foregoing three system call commands are respectively processed in the three CPU cores at different speeds, returned results of the system call task may not be returned in the sequence of entering the kernel by the system call commands. As a result, the returned results of the system call task are non-sequential.

SUMMARY

Embodiments of the present disclosure provide a method and apparatus for system call command batch processing. The method and apparatus for system call command batch processing can classify multiple system call commands, and distributes, according to a sequence of entering a kernel by the system call commands, system call commands of a same type to a same CPU core for processing, so that the system call commands of a same type are processed in a same CPU core, thereby ensuring that returned results of a system call task are sequential.

To achieve the foregoing objective, the following technical solutions are used in the embodiments of the present disclosure:

According to a first aspect, an embodiment of the present disclosure provides a method for system call command batch processing, where the method is applied to a multi-core system including multiple central processing unit CPU cores, and the method includes:

obtaining multiple system call commands, where the multiple system call commands are commands Mat need to call a kernel function;

classifying the multiple system call commands according to task identifiers of the multiple system call commands, where system call commands of a same type have a same task identifier; and sending, according to a sequence of obtaining the multiple system call commands, system call commands of a same type to a same CPU core for processing.

With reference to the first aspect, in a first possible implementation manner of the first aspect, after the classifying the multiple system call commands according to task identifiers of the multiple system call commands, the method further includes:

obtaining a call count of each system call command processed by a first CPU core, where the first CPU core is any CPU core of the multiple CPU cores, and the call count of each system call command is an execution count of each system call command in the multi-core system;

determining a priority of each system call task according to the call count of each system call command processed by the first CPU core, where the, first CPU core processes system call tasks of at least two different types, the system call tasks of the different types have different task identifiers, and each system call task includes multiple system call commands that have a same task identifier; and the sending, according to a sequence of obtaining the multiple system call commands, system call commands of a same type to a same CPU core for processing includes:

according to the determined priority of each system call task, separately sending, according to a sequence of priorities, the system call tasks of the different types to the first CPU core for processing, where the multiple system call commands included in each system call task are separately sent to the first CPU core according to the obtaining sequence.

With reference to the first possible implementation manner of the first aspect, in a second possible implementation manner of the first aspect, a system call knowledge base is stored in the multi-core system, and the system call knowledge base includes the call count of each system call command processed by the multi-core system; and the obtaining a call count of each system call command processed by a first CPU core includes:

obtaining, according to a sum of 1 and the call count that is of each system call command processed by the first CPU core and that is recorded in the system call knowledge base, a current call count of each system call command processed by the first CPU core.

With reference to the first aspect or the first possible implementation manner of the first aspect, in a third possible implementation manner of the first aspect, after the classifying the multiple system call commands, the method further includes:

allocating a CPU core to each type of system call command; and the sending system call commands of a same type to a same CPU core for processing specifically includes:

obtaining a first CPU core identifier of a system call command of a first type, where the first type is any type determined after the multiple system call commands are classified; and sending, according to the first CPU core identifier, the system call command of the first type to the first CPU core for processing.

With reference to the third possible implementation manner of the first aspect, in a fourth possible implementation manner of the first aspect, the allocating a CPU core to each type of system call command includes:

obtaining a first task identifier of the system call command of the first type;

determining that a task identifier of a second system call command is the same as the first task identifier, where the second system call command is any command of system call tasks that have been sent to the first CPU core for processing; and allocating the first CPU core to the system call command of the first type.

According to a second aspect, an embodiment of the present disclosure provides an apparatus for system call command batch processing, where the apparatus includes multiple central processing unit. CPU cores, and the apparatus includes:

an obtaining module, configured to obtain multiple system call commands, where the multiple system call commands are commands that need to call a kernel function;

a classification module, configured to classify the multiple system call commands according to task identifiers of the multiple system call commands, where system call commands of a same type have a same task identifier; and a sending module, configured to send, according to a sequence of obtaining the multiple system call commands, system call commands of a same type to a same CPU core for processing.

With reference to the second aspect, in a first possible implementation manner of the second aspect, the obtaining module is further configured to obtain a call count of each system call command processed by a first CPU core, where the first CPU core is an CPU core of the multiple CPU cores, and the call count of each system call command is an execution count of each system call command in the multi-core system;

the apparatus further includes: a determining module, configured to determine a priority of each system call task according to the call count of each system call command processed by the first CPU core, where the first CPU core processes system call tasks of at least two different types, the system call tasks of the different types have different task identifiers, and each system call task includes multiple system call commands that have a same task identifier; and the sending module is specifically configured to: according to the determined priority of each system call task, separately send, according to a sequence of priorities, the system call tasks of the different types to the first CPU core for processing, where the multiple system call commands included in each system call task are separately sent to the first CPU core according to the obtaining sequence.

With reference to the first possible implementation manner of the second aspect, in a second possible implementation manner of the second aspect, the apparatus further includes:

a storage module, configured to store a system call knowledge base, where the system call knowledge base includes the call count of each system call command processed by the multi-core system; and the obtaining module is specifically configured to obtain, according to a sum of 1 and the call count that is of each system call command processed by the first CPU core and that is recorded in the system call knowledge base, a current call count of each system call command processed by the first CPU core.

With reference to the second aspect or the first possible implementation manner of the second aspect, in a third possible implementation manner of the second aspect, the apparatus further includes:

an allocation module, configured to allocate a CPU core to each type of system call command; and the sending module is specifically configured to obtain a first CPU core identifier of a system call command of a first type, where the first type is any type determined after the multiple system call commands are classified, and send, according to the first CPU care identifier, the system call command of the first type to the first CPU core for processing.

With reference to the third possible implementation manner of the second aspect, in a fourth possible implementation manner of the second aspect, the allocation module is specifically configured to obtain a first task identifier of the system call command of the first type; determine that a task identifier of a second system call command is the same as the first task identifier, where the second system call command is any command of system call tasks that have been sent to the first CPU core for processing; and allocate the first CPU core to the system call command of the first type.

The embodiments of the present disclosure provide a method and apparatus for system call command batch processing. The method is applied to a multi-core system including multiple CPU cores. The method includes: obtaining multiple system call commands, where the multiple system call commands are commands that need to call a kernel function: classifying the multiple system call commands according to task identifiers of the multiple system call commands, where system call commands of a same type have a same task identifier: and sending, according to a sequence of obtaining the multiple system call commands, system call commands of a same type to a same CPU core for processing.

On a basis of the description in the foregoing embodiments, the multiple system call commands are classified according to the task identifiers of the multiple system call commands, and the system call commands of a same type are sent to a same CPU core for processing, thereby ensuring that system call commands that have a same task identifier are processed in a same CPU core. In addition, multiple system call commands included in one stem call task have a same task identifier, and the multiple system call commands are sent, according to a sequence of obtaining the system call commands, to a same CPU core for processing. Therefore, returned results of system call commands of a same type are sequential.

BRIEF DESCRIPTION OF DRAWINGS

To describe the technical solutions in the embodiments of the present disclosure more clearly, the following briefly describes the accompanying drawings required for describing he embodiments or the prior art. Apparently, the accompanying drawings in the following description show merely some embodiments of the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure.

Embodiment 1

Figure 1:
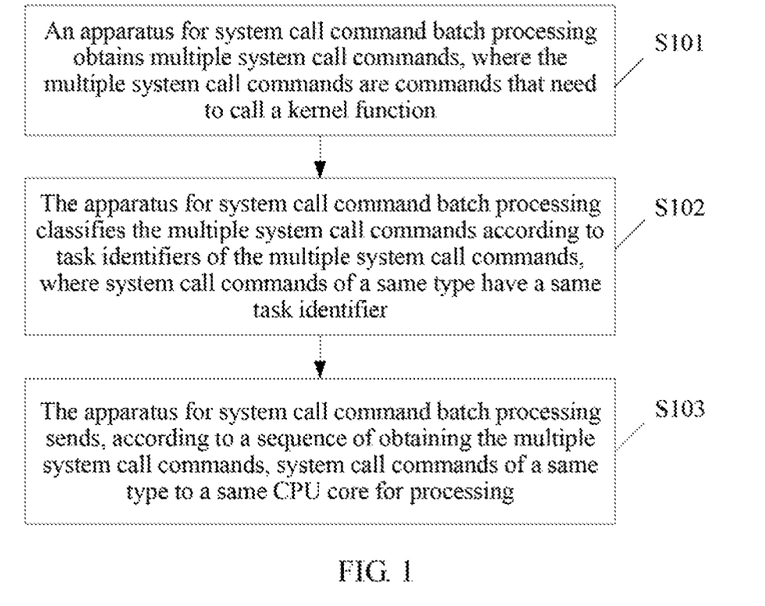
FIG. 1 is a schematic flowchart 1 of a method for system call command batch processing according to an embodiment of the present disclosure.

This embodiment provides a method for system call command batch processing. The method is applied to a multi-core system including multiple CPU cores, and the multiple CPU cores concurrently process system call commands. As shown in FIG. 1, FIG. 1 is a schematic flowchart of the method for system call command batch processing. The method may be executed by an apparatus tor system call command batch processing in the multi-core system, and the apparatus for system call command batch processing may he a controller in the multi-core system. The method may include the following steps.

S101: Obtain multiple system call commands, where the multiple system call commands are commands that need to call a kernel function.

The kernel Unction refers to a function that is inside an operating system and that can be used only in a kernel mode. The kernel function exists to protect the operating system, so that user space is separated from kernel space.

Specifically when the system call commands enter the kernel, the apparatus for system call command batch processing caches the system call commands in a system call cache cable according to a sequence of entering the kernel by the system call commands. At the same time, parameters related to the system call commands are also cached in the system call cache cable. The parameters related to the system call commands include task identifiers of the system call commands, a system call number of the kernel function called by the system call commands, an argument required for completing the system call commands, and the like.

Optionally, the apparatus for system call command batch processing may periodically perform batch processing on the multiple system call commands in the system call cache cable. After finishing processing the system call commands in the system call cache cable, the apparatus for system call command batch processing clears the system call cache cable, and then caches a next batch of system call commands on which batch processing needs to be performed. The system call cache cable is stored in kernel address space.

When the system call cache cable is empty, a system call thread is idling, that is, the system call thread executes a null statement. The system call thread is a control program that schedules the system call commands in the system call cache cable to the CPU cores for processing.

S102: Classify the multiple system call, commands according to task identifiers of the multiple system call commands, where system call commands of a same type have a same task identifier.

Before performing batch processing on the system call commands, the apparatus for system call command batch processing classifies the multiple system call commands in the system call cache table according to the task identifiers of the system call commands. System call commands, of a same type have a same task identifier.

It should be noted that one system call task includes multiple system call commands, and the multiple system call commands included in the system call task have a same task identifier.

It should be further noted that each system call command has a unique serial number, that is, a system call number. The system call number is a unique serial number defined by the operating system for each system call command. A system call table is stored in the kernel, and the table stores the system call numbers, of all the system call commands, provided by the operating system, together with entry addresses of kernel functions corresponding to the system call commands.

S103: Send, according to a sequence of obtaining the multiple system call commands, system call commands of a same type to a same CPU core for processing.

Specifically, that a user program needs to complete a task of reading a file in a memory is used as an example for description. When executing the task, the user program calls two system call commands; an open command and a read command. These two system call commands have a same task identifier, and the open command enters the kernel first and the read command enters the kernel later. The apparatus for system call command batch processing sends, according to a sequence of entering the kernel by the system call commands, the system call commands to a same CPU core for processing. In this way, system call commands that have a same task identifier are executed in a same CPU core according to a sequence of entering the kernel, thereby ensuring that returned results of the system call commands that have a same task identifier are sequential.

A quantity of task types of system call commands is generally greater than a quantity of CPU cores. Therefore, multiple system call commands of different task types may be processed in a same CPU core, and the CPU core processes system call commands of a next task type only after completing processing on all system call commands of a current type.

This embodiment of the present disclosure provides a method for system call command batch processing. The method is applied to a multi-core system including multiple CPU cores and includes: obtaining, by an apparatus for system call command batch processing, multiple system call commands, where the multiple system call commands are, commands that need to call, a kernel function; Classifying the multiple system call commands according to task identifiers of the multiple system call commands, where system call commands of a same type have a same task identifier; and sending, according to a sequence of obtaining the multiple system call commands, system call commands of a same type to a same CPU core for processing.

On a basis of the description in the foregoing embodiment, the apparatus for system call command batch processing classifies the multiple system call commands according to the task identifiers of the multiple system call commands, and sends the system call commands of a same type to a same CPU core for processing, thereby ensuring that system call commands that have a same task identifier are processed in a same CPU core. In addition, multiple system call commands included in one system call task have a same task identifier, and the multiple system call commands are sent, according to a sequence of obtaining the system call commands, to a same CPU core for processing. Therefore, returned results of system call commands of a same type are sequential.

Embodiment 2

Figure 2:
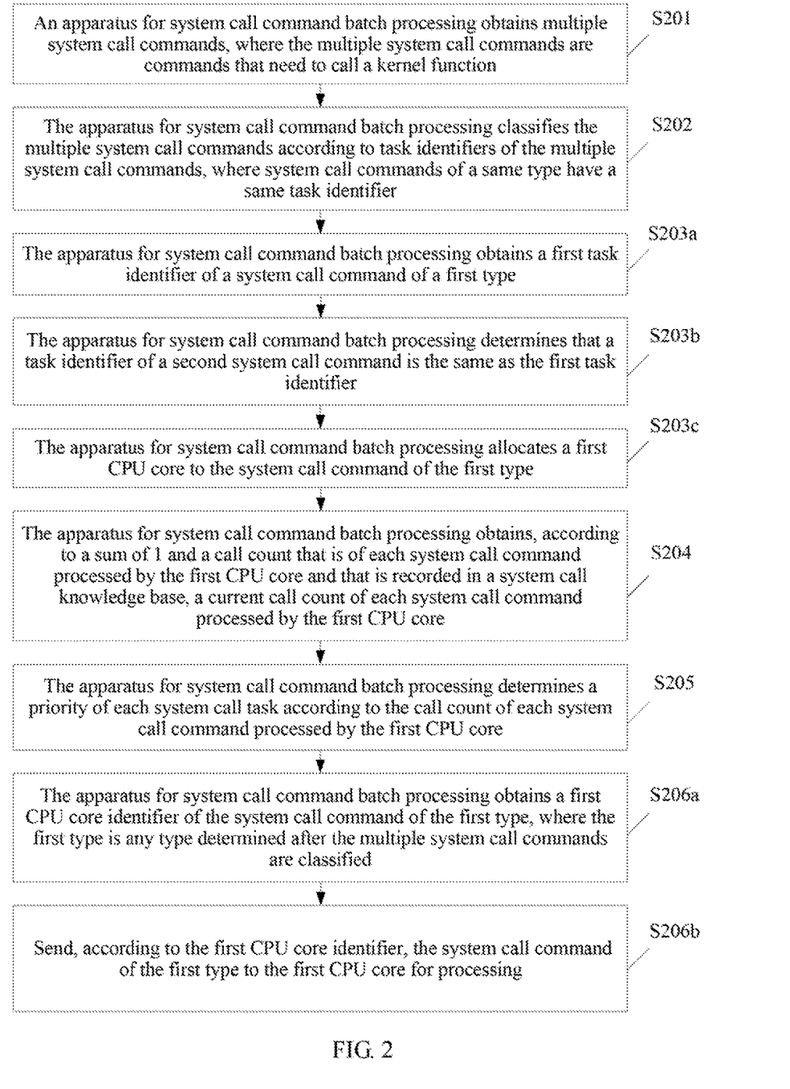
FIG. 2 is a schematic flowchart 2 of a method for system call command batch processing according to an embodiment of the present disclosure.

This embodiment of the present disclosure provides a method for system call command batch processing, where the method is applied to a multi-core system including multiple CPU cores, and the multiple CPU cores concurrently process system call commands. As shown in FIG. 2, FIG. 2 is a schematic flowchart of the method for system call command hatch processing. The method includes the following steps.

S201: Obtain multiple system call commands, where the multiple system call commands are commands that need to call a kernel function, Specifically, after the system call commands enter the kernel, an apparatus for system call command batch processing caches the system call commands in a system call cache cable according to a sequence of entering the kernel by the system call commands, and performs batch processing on the multiple system call commands after a preset time.

S202: Classify the multiple system call commands according to task identifiers of the multiple system call commands, where system call commands of a same type have a same task identifier.

In the prior art, system call commands of a same type may be distributed to different CPU cores for processing, thereby leading to non-sequential returned results of the system call commands of a same type, and even occurrence of an error.

In the technical solutions of the present disclosure, the apparatus for system call command batch processing classifies, according to the task identifiers, the multiple system call commands cached in the system call cache cable, and distributes, according to the sequence of entering the kernel, the system call commands of a same type to a same CPU core for processing, thereby ensuring that the multiple system call commands that have a same task identifier are processed in a same CPU core, and returned results of the multiple system call commands of a same type are sequential.

S203: Allocate a CPU core to each type of system call command.

Specifically, after classifying the multiple system call commands according to the task identifiers of the multiple system call commands, the apparatus for system call command batch processing further allocates a same CPU core to each type of system call command.

The distributing the system call commands of a same type to a same CPU core for processing refers to allocating a same CPU core identifier to the system call commands of a same type. The CPU core identifier is used to uniquely identify a CPU core, and the multiple CPU cores existing in the multi-core system have different CPU core identifiers.

Exemplarily, the system call cache cable has system call commands of two task types, and Table 1 lists a result of classifying the system call commands.

TABLE 1

| ... | task_ID1 | command1 | ... | core1 |
| ... | task_ID1 | command2 | ... | core1 |
| ... | task_ID2 | command3 | ... | core2 |
| ... | task_ID2 | command4 | ... | core2 |
| ... | task_ID2 | command5 | ... | core2 | task_ID1 and task_ID2 are task identifiers of system call commands, command1, command2, . . . , and command5 are identifiers of different system call commands, and core1 and core2 represent core identifiers of CPU cores.

It can be learned from Table 1 that, the two system call commands command1 and command2 that have the task identifier task_ID1 are allocated to the CPU core core1 for processing, and the three system call commands command3, command4, and command5 that have the task identifier task_ID2 are allocated to the CPU core core2 for processing.

Specifically, S203 includes S203a to S203c.

S203a: Obtain a first task identifier of a system call command of a first type.

the first type of the system call command is any type determined after the multiple system call commands are classified.

S203b: Determine that a task identifier of a second system call command is the same as the first task identifier.

The second system call command is any command of system call tasks that have been sent to a first CPU COM for processing. The first CPU core is any CPU CON of the multiple CPU cares.

If the task identifier of the second system call command is the same as the first task identifier, it indicates that the system call command of the first type and the second system call command have a same task identifier and are system call commands of a same type. Therefore, the system call command of the first type and the second system call command should be allocated to a same CPU core for processing.

S203c: Allocate a first CPU core to the system call command of the first type.

The classification process of the system call commands in Table 1 is used as an example. A system call command that first enters the kernel is command1, a task identifier of command1 is task_ID1, and the core identifier core1 of the first CPU core is randomly allocated to command1. A system call command that secondly enters the kernel is command2, the task identifier task_ID1 of command2 is obtained, and if the task identifier task_ID1 of command2 is the same as that of command1, the core identifier core1 of the first CPU core is also allocated to the system call command command2.

It should be noted that, in S203a to S203c, it may be ensured that the system call commands that have a same task identifier are distributed to a same CPU core for processing. In practice, a quantity of types of system call commands is generally greater than a quantity of CPU cores in the kernel.

Therefore, when a CPU, core is allocated to each type of system call command, system call commands of different types may be distributed to a same CPU core for processing. In this case, the CPU core starts to execute system call commands of a next type only after completing execution on all system call commands of a current type.

S204: Obtain, according to a sum of 1 and a call count that is of each system call command processed by the first CPU core and that is recorded in a system call knowledge base, a current call count of each system call command processed by the first CPU core.

The first CPU core is any CPU core of the multiple CPU cores.

It should be noted that, the system call knowledge base is stored in the kernel, and stores call counts of all system call commands ever processed by the multi-core system, in addition, multiple system call commands of a same task type have a same call count, and this call count may be used as a basis of a priority of a system call task to which the multiple system call commands of the type belong.

A call count, of a system call command, stored in the system call knowledge base refers to an execution count of the system call command in the multi-core system.

When the call count of each system call command processed by the first CPU core is obtained, if a corresponding system call command exists in the system call knowledge base, a call count of the corresponding call count is updated; or if no corresponding system call command exists in the system call knowledge base, it indicates that the system call command has never been called in the multi-core system, the corresponding system call command is added to the system call knowledge base, and the call count of the system call command is updated according to a current call count of the system call command.

Specifically, when updating the corresponding system call command in the system call knowledge base, if there are two identical system call commands, the apparatus for system call command batch processing performs an operation of increasing the call count by 1 twice on the system call command in the system call knowledge base.

The apparatus for system call command batch processing obtains the call count of each system call command processed by the first CPU core, and uses the call count to indicate a priority of a system call task to which the system call command belongs.

It should be supplemented that, system call commands of a same type have a same call count, it may be understood that, one system call task of a. user can be completed only after all system call commands of a same type are sequentially executed. For example, when a user program needs to complete a task of reading a disk file, the system call task includes two system call commands that have a same task identifier: an open command and a read command, and the system call task of the user program can he completed only by sequentially executing the two commands. Therefore, the multiple system call commands of a same type have a same call count.

S205: Determine a priority of each system call task according to the call count of each system call command processed by the first CPU core.

The first CPU core processes system call tasks of at least two different types. The system call tasks of the different types have different task identifiers, and each system call task includes multiple system call commands that have a same task identifier. A call count of each system call command is an execution count of each system call command in the multi-core system. It may be understood that, a larger call count of a system call command indicates a higher priority of a system call task corresponding to the system call command.

S206: According to a determined priority of each system call task, separately send, according to a sequence of priorities, system call tasks of different types to the first CPU core for processing.

The multiple system call commands included in each system call task arc separately sent to the first CPU core according to a sequence of obtaining the system call commands.

Specifically, S206 includes S206a and S206b.

S206a: Obtain a first CPU core identifier of a system call command of a first type, where the first type is any type determined after the multiple system call commands are classified.

S206b: Send, according to the first CPU cote identifier, the system call command of the first type to the first CPU core for processing.

When allocating at least two types of system call tasks to the first CPU core, the apparatus for system call command batch processing may determine a priority of each system call task according to a call count of each system call task. Call counts of multiple system call commands of a same type are used to indicate a call count of a system call task of this type. A larger call count of a system call command indicates a larger call count of a system call task to which the system call command belongs, a higher priority is allocated to the system call task of this type, and the first CPU core takes priority in processing system call commands of the system call task of this type.

S204 to S206 are steps required when the apparatus for system call command batch processing processes the system call tasks of the different types according to the sequence of priorities. If the system call tasks do not need to be processed according to the sequence of priorities, the apparatus for system call command hatch processing sequentially schedules, according to the sequence of entering the kernel, the system call tasks of the different types to allocated CPU cores for processing.

A solution provided in this embodiment of the present disclosure for determining a priority is only an optional solution, and a method in the prior art may be further used to determine priorities of system call tasks of different types. For example, a delimit priority may be preset in the prior art, and the default priority may be used as an indication of a sequence of processing system call tasks.

The following describes complete execution of this solution using the solution provided in this embodiment of the present disclosure for determining a priority.

Exemplarily, a form of a system call cache cable may be shown in Table 2.

TABLE 2

| system call | task_ID | command | argument | status | coreid | ... |
|---|---|---|---|---|---|---|
| ... | ... | ... | ... | ... | ... | ... |

Generally, system call commands in the system call cache cable may have flag bits shown in Table 2. syscall number (syscall number) represents system call numbers corresponding to different system call commands, and each system call command has a unique system call number. command (command) represents a command type of a system call command, and the command type is related to a command line of the system call command. argument (argument) represents a parameter required for completing a system call command. status (status) represents a current processing status of a system call command, and may represent whether a current system call bas been processed. coreid (coreid) represents an identifier of a CPU core to which a system call command is allocated for processing.

When the system call commands enter the kernel, the apparatus for system call command batch processing caches the system call commands in the system call cache cable according to the sequence of entering the kernel. It is assumed that 12 system call commands are cached in the system call cache cable, the multi-core system has two available CPU cores, and the system call cache cable is shown in Table 3. A result obtained after the 12 system call commands are classified according to task identifiers of the system call commands is shown in Table 3:

TABLE 3

| system call | task_ID | command | argument | status | coreid | ... |
|---|---|---|---|---|---|---|
| 1 | task_ID1 | command1 | ... | ... | coreid1 | ... |
| 2 | task_ID1 | command2 | ... | ... | coreid1 | ... |
| 3 | task_ID1 | command3 | ... | ... | coreid1 | ... |
| 4 | task_ID2 | command4 | ... | ... | coreid2 | ... |
| 5 | task_ID2 | command5 | ... | ... | coreid2 | ... |
| 6 | task_ID2 | command6 | ... | ... | coreid2 | ... |
| 7 | task_ID2 | command7 | ... | ... | coreid2 | ... |
| 1 | task_ID1 | command1 | ... | ... | coreid1 | ... |
| 2 | task_ID1 | command2 | ... | ... | coreid1 | ... |
| 3 | task_ID1 | command3 | ... | ... | coreid1 | ... |
| 8 | task_ID3 | command8 | ... | ... | coreid2 | ... |
| 9 | task_ID3 | command9 | ... | ... | coreid2 | ... |

Specifically, a sequence of entering the kernel by the system call commands is a cache sequence in the system call cache cable. It can be learned from Table 3 that, the apparatus for system call command batch processing classifies the 12 system call commands in the system call cache cable according to task identifiers task_ID. and allocates a same CPU core identifier to system call commands of a same type.

First, system call commands command1, command2, and command3 have a same task identifier task_ID1. Therefore the three system call commands are of a same task type (referred to as task 1), and a first CPU core identifier coreid1 is allocated to the three system call commands. System call commands command4, command5, command6, and command7 have a same task identifier task__ID2. Therefore the four system call commands are of a same task type (referred to as task 2), and a second CPU core identifier coreid2 is allocated to the four system call commands. Then, next system call commands command1, command2 and command3 are classified. Because task identifiers of the three commands are the same as the task identifier of task 1, a CPU core same as that of task 1, namely, coreid1, is allocated to the three commands. Final two system call commands command8 and command9 have a same task identifier task_ID3. Therefore, the two system call commands are of a same task type (referred to as task 3), and task 3 is different from the task types of the foregoing system call commands. Theoretically, an idle CPU core should be allocated to task 3. However, due to a quantity limit of the CPU cores, task 3 and task 2 are distributed to a same CPU core for processing, and the CPU core identifier coreid2 same as that of task 2 is allocated to task 3.

Before the apparatus for system call command batch processing schedules the system call commands to the CPU cores for processing, the apparatus for system call command batch processing needs to update corresponding call counts of the system call commands in the system call knowledge base.

Exemplarily, it is assumed that the system call knowledge base before being updated is shown in Table 4:

TABLE 4

| system call | task_ID | command | count | ... |
|---|---|---|---|---|
| 1 | task_ID1 | command1 | 200 | ... |
| 2 | task_ID1 | command2 | 200 | ... |
| 3 | task_ID1 | command3 | 200 | ... |
| 4 | task_ID2 | command4 | 100 | ... |
| 5 | task_ID2 | command5 | 100 | ... |
| 6 | task_ID2 | command6 | 100 | ... |
| 7 | task_ID2 | command7 | 100 | ... |

A process of updating the system call knowledge base is as follows: The apparatus for system call command batch processing obtains the call count of each system call command processed by the first CPU core, and separately increases, by 1, the call count of each system call command processed by the first CPU core. Table 5 lists a result of updating a call count in the system call knowledge base with reference to the system call commands processed by the first CPU core in Table 3.

TABLE 5

| system call | task_ID | command | count | ... |
|---|---|---|---|---|
| 1 | task_ID1 | command1 | 202 | ... |
| 2 | task_ID1 | command2 | 202 | ... |
| 3 | task_ID1 | command3 | 202 | ... |
| 4 | task_ID2 | command4 | 100 | ... |
| 5 | task_ID2 | command5 | 100 | ... |
| 6 | task_ID2 | command6 | 100 | ... |
| 7 | task_ID2 | command7 | 100 | ... |

It should be noted that, the first CPU core and the second CPU core process the system call commands at the same time. The foregoing process of updating the system call knowledge base is described using the first CPU core merely as an example. After the call count in the system call knowledge base is updated, an updated call count of the system call command is obtained.

Specifically, the first CPU core and the second CPU core process the system call commands at the same time, and Table 6 lists a result of updating the system call knowledge base.

TABLE 6

| system call | task_ID | command | count | ... |
|---|---|---|---|---|
| 1 | task_ID1 | command1 | 202 | ... |
| 2 | task_ID1 | command2 | 202 | ... |
| 3 | task_ID1 | command3 | 202 | ... |
| 4 | task_ID2 | command4 | 101 | ... |
| 5 | task_ID2 | command5 | 101 | ... |
| 6 | task_ID2 | command6 | 101 | ... |
| 7 | task_ID2 | command7 | 101 | ... |
| 8 | task_ID3 | command8 | 1 | ... |
| 9 | task_ID3 | command9 | 1 | ... |

In this embodiment, the two system call tasks allocated by the apparatus for system call command batch processing to the first CPU core for processing are two identical system call tasks. The two system call tasks have a same call count recorded in the system call knowledge base. The apparatus for system call command batch processing sequentially schedules, according to a sequence of entering the kernel, the two system, call tasks to the first CPU core for processing.

In this embodiment, the two system call tasks allocated to the second CPU core by the apparatus for system call command hatch processing for processing am tasks of different types. It can be learned with reference to Table 3 and Table 4 that, the call count, of task 2, recorded in the system call knowledge base is greater than the call count, of task 3, recorded in the system call knowledge base. Therefore, in this embodiment, it may be considered that a priority of task 2 is higher than a priority of task 3. Therefore, the apparatus for system call command batch processing first sequentially schedules the system call commands of task 2 to the second CPU core for processing, and after the second CPU core sequentially completes the processing on the system call commands of task 2, sequentially schedules the system call commands of task 3 to the second CPU core for processing. In this way, it is ensured that a system call task of a high priority is first processed, and system call commands of a same task type are scheduled to a same CPU core for processing, so that returned results of a same system call task is sequential.

This embodiment of the present disclosure provides a method for system call command batch processing. The method is applied to a multi-core system including multiple CPU cores and includes: obtaining, by an apparatus for system call command batch processing, multiple system call commands, where the multiple system call commands are commands that need to call a kernel function; classifying the multiple system call commands according to task identifiers of the multiple system call commands, where system call commands of a same type have a same task identifier; and sending, according to a sequence of obtaining the multiple system call commands, system call commands of a same type to a same CPU core for processing.

On a basis of the description in the foregoing embodiment, the apparatus for system call command batch processing classifies the multiple. system call commands according to the task identifiers of the multiple system call commands, and sends the system call commands of a same type to a same CPU core for processing, thereby ensuring that system call commands that have a same task identifier are processed in a same CPU core. In addition, multiple system call commands included in one system call task have a same task identifier, and the multiple system call commands are sent, according to a sequence of obtaining the system call commands, to a same CPU core for processing. Therefore, returned results of system call commands of a same type are sequential.

Embodiment 3

Figure 3:
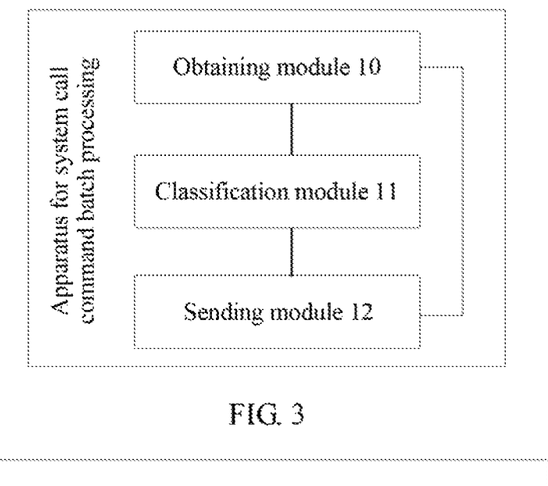
FIG. 3 is a schematic structural diagram 1 of an apparatus for System call command batch processing according to an embodiment of the present disclosure.

This embodiment of the present disclosure provides an apparatus for system call command batch processing. The apparatus includes multiple CPU cores. FIG. 3 shows a schematic structural diagram of the apparatus, and the apparatus includes an obtaining module 10, a classification module 11, and a sending module 12.

The obtaining module 10 is configured to obtain multiple system call commands, where the multiple system call commands are commands that need to call a kernel function.

The classification module 11 is configured to classify the multiple system call commands according to task identifiers of the multiple system call commands, where system call commands of a same type have a same task identifier.

The sending module 12 is configured to send, according to a sequence of obtaining the multiple system call commands, system call commands of a same type to a same CPU core for processing.

The obtaining module 10 is further configured to obtain a call count of each system call command processed by a first CPU core, where the first CPU core is any CPU core of the multiple CPU cores, and the call count of each system call command is an execution count of each system call command in the multi-core system.

Figure 4:
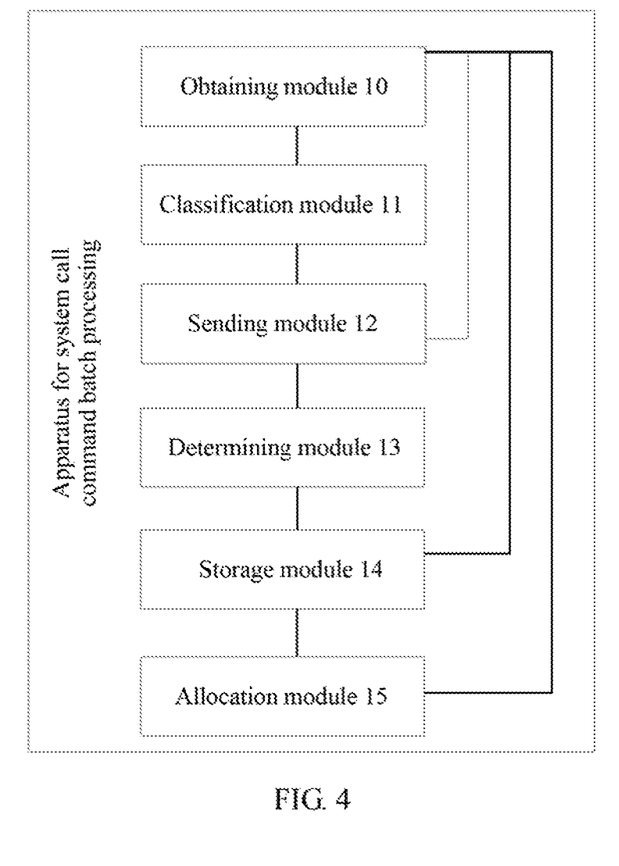
FIG. 4 is a schematic structural diagram 2 of an apparatus for system call command batch processing according to an embodiment of the present disclosure.

As shown in FIG. 4, the apparatus further include a determining module 13, a storage module 14, and an allocation module 15.

The determining module 13 is configured to determine a priority of each system call task according to the call count of each system call command processed by the first CPU core, where the first CPU core processes system call tasks of at least two different types, the system call tasks of the different types have different task identifiers, and each system call task includes multiple system call commands that have a same task identifier.

The sending module 12 is specifically configured to: according to the determined priority of each system call task, separately send, according to a sequence of priorities, the system call tasks of the different types to the first CPU core for processing where the multiple system call commands comprised in each system call task are separately sent to the first CPU core according to the obtaining sequence.

The storage module 14 is configured to store a system call knowledge base, where the system call knowledge base includes the call count of each system call command processed by the multi-core system.

The obtaining module 10 is specifically configured to obtain, according to a sum of 1 and the call count that is of each system call command processed by the first CPU core and that is recorded in the system call knowledge base, a current call count of each system call command processed by the first CPU core.

The allocation module 15 is configured to allocate a CPU core to each type of system call command.

The sending module 12 is specifically configured to obtain a first CPU core identifier of a system call command of a first type, where the first type is any type determined after the multiple system call commands are classified; and send, according to the first CPU core identifier, the system call command of the first type to the first CPU core for processing.

The allocation module 15 is specifically configured to obtain a first task identifier of the system call command of the first type; determine that a task identifier of a second system call command is the same as the first task identifier, where the second system call command is any command of system call tasks that have been sent to the first CPU core for processing; and allocate the first CPU core to the system call command of the first type.

This embodiment of the present disclosure provides an apparatus for system call command batch processing. The apparatus includes multiple CPU cores. An obtaining module can obtain multiple system call commands, where the multiple system call commands are commands that need to call a kernel function; a classification module classifies the multiple system call commands according to task identifiers of the multiple system call commands, where system call commands of a same type have a same task identifier; and a sending module sends, according to a sequence of obtaining the multiple system call commands, system call commands of a same type to a same CPU core for processing.

On a basis of the description in the foregoing embodiment, the apparatus for system call command batch processing provided in the present disclosure classifies the multiple system call commands according to the task identifiers of the multiple system call commands, and the system call commands of a same type are sent to a same CPU core for processing, thereby ensuring that system call commands that have a same task identifier are processed in a same CPU core. In addition, multiple system call commands included in one system call task have a same task identifier, and the multiple system call commands are sent, according to a sequence of obtaining the system call commands, to a same CPU core for processing. Therefore, returned results of system call commands of a same type are sequential.

Embodiment 4

This embodiment of the present disclosure provides an apparatus for system call command batch processing. The apparatus includes multiple CPU cores.

Figure 5:
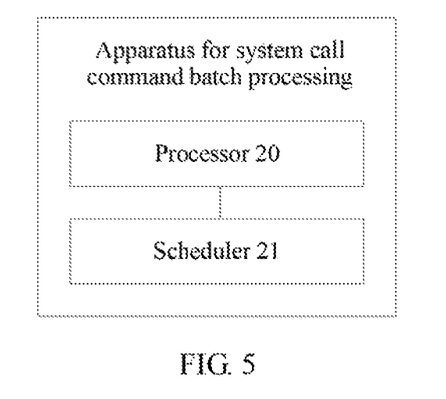
FIG. 5 is a schematic structural diagram 3 of an apparatus for system call command batch processing according to an embodiment of the present disclosure.

As shown in FIG. 5, the apparatus includes:

a processor 20, configured to obtain multiple system call commands, where the multiple system call commands are commands that need to call a kernel function; and classify the multiple system call commands according to task identifiers of the multiple system call commands, where system call commands of a same type have a same task identifier; and a scheduler 21, configured to send, according to a sequence of obtaining the multiple system call commands, system call commands of a same type to a same CPU core for processing.

The processor 20 is further configured to obtain a call count of each system call command processed by a first CPU core, where the first CPU core is any CPU core of the multiple CPU cores, and the call count of each system call command is an execution count of each system call command in the multi-core system; determine a priority of each system call task according to the call count of each system call command processed by the first CPU core, where the first CPU core processes system call tasks of at least two different types, the system call tasks of the different types have different task identifiers, and each system call task includes multiple system call commands that have a same task identifier.

The scheduler 21 is specifically configured to: according to the determined priority of each system call task, separately sending, according to a sequence of priorities, the system call tasks of the different types to the first CPU core for processing, where the multiple system call commands comprised in each system call task are separately sent to the first CPU core according to the obtaining sequence.

Figure 6:
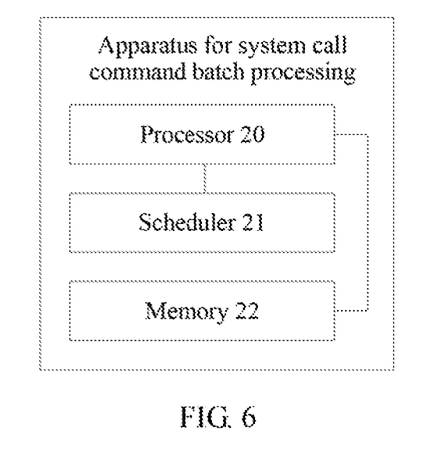
FIG. 6 is a schematic structural diagram 4 of an apparatus for system call command batch processing according to an embodiment of the present disclosure.

As shown in FIG. 6, the apparatus further includes:

a memory 22, configured to store a system call knowledge base, where the system call knowledge base includes the call count of each system call command processed by the multi-core system.

The processor 20 is specifically configured to obtain, according to a sum of 1 and the call count that is of each system call command processed by the first CPU core and that is recorded in the system call knowledge base, a current call count of each system call command processed by the first CPU core.

The processor 20 is further configured to allocate a CPU core to each type of system call command.

The scheduler 21 is specifically configured to obtain a first CPU core identifier of a system call command of a first type, where the first type is any type determined after the multiple system call commands are classified; and send, according to the first CPU core identifier, the system call command of the first type to the first CPU core for processing.

The processor 20 is specifically configured to obtain a first task identifier of the system call command of the first type; determine that a task identifier of a second system call command is the same as the first task identifier, where the second system call command is any command of system call tasks that have been sent to the first CPU core for processing; and allocate the first CPU core to the system call command of the first type.

This embodiment of the present disclosure provides an apparatus for system call command batch processing. The apparatus includes multiple CPU cores. A processor can obtain multiple system call commands, where the multiple system call commands are commands that need to call a kernel function; and classify the multiple system call commands according to task identifiers of the multiple system call commands, where system call commands of a same type have a same task identifier. A scheduler sends, according to a sequence of obtaining the multiple system call commands, system call commands of a same type to a same CPU core for processing.

On a basis of the description in the foregoing embodiment, the apparatus for system call command batch processing provided in the present disclosure classifies the multiple system call commands according to the task identifiers of the multiple system call commands, and the system call commands of a same type are sent to a same CPU core for processing, thereby ensuring that system call commands that have a same task identifier are processed in a same CPU core. In addition, multiple system call commands included in one system call task have a same task identifier, and the multiple system call commands are sent, according to a sequence of obtaining the system call commands, to a same CPU core for processing. Therefore, returned results of system call commands of a same type are sequential.

In the several embodiments provided in the present application, it should be understood that the disclosed apparatus and method may be implemented in other manners. For example, the described apparatus embodiment is merely exemplary. For example, the module division is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc. The foregoing descriptions are merely specific embodiments of the present disclosure, but are not intended to limit the protection scope of the present disclosure.

What is claimed is:

1. A method for system call command batch processing performed by a multi-core system comprising multiple central processing unit (CPU) cores, the method comprising:
    obtaining multiple system call commands comprising commands that need to call a kernel function;
    classifying the multiple system call commands according to task identifiers of the multiple system call commands, wherein system call commands of a same type have a same task identifier;
    obtaining a call count of each system call command processed by a first CPU core in the multiple CPU cores, wherein the call count of each system call command is an execution count of each system call command in the multi-core system;
    determining a priority of each system call task according to the call count of each system call command processed by the first CPU core, wherein the first CPU core processes system call tasks of at least two different types, the system call tasks of the different types have different task identifiers, and each system call task comprises multiple system call commands that have a same task identifier; and
    sending, according to a sequence of obtaining the multiple system call commands, system call commands of a same type to a same CPU core for processing, the sending comprising:
        separately sending, according to a sequence of priorities based on the determined priority of each system call task, the system call tasks of the different types to the first CPU core for processing, wherein the multiple system call commands in each system call task are separately sent to the first CPU core according to an obtaining sequence.

2. The method according to claim 1, further comprising:
    allocating a CPU core to each type of system call command after the classifying the multiple system call commands; and
    the sending system call commands of a same type to a same CPU core for processing comprises:
    obtaining a first CPU core identifier of a system call command of a first type, wherein the first type is any type determined after the multiple system call commands are classified; and
    sending, according to the first CPU core identifier, the system call command of the first type to the first CPU core for processing.

3. The method according to claim 2, wherein the allocating a CPU core to each type of system call command comprises:
    obtaining a first task identifier of the system call command of the first type;
    determining that a task identifier of a second system call command is the same as the first task identifier, wherein the second system call command is any command of system call tasks that have been sent to the first CPU core for processing; and
    allocating the first CPU core to the system call command of the first type.

4. The method according to claim 1, wherein a system call knowledge base is stored in the multi-core system, and the system call knowledge base comprises the call count of each system call command processed by the multi-core system; and
    the obtaining a call count of each system call command processed by a first CPU core comprises:
    obtaining, according to a sum of 1 and the call count that is of each system call command processed by the first CPU core and that is recorded in the system call knowledge base, a current call count of each system call command processed by the first CPU core.

5. A computing system, comprising:
    multiple central processing unit (CPU) cores;
    a memory coupled to the multiple CPU cores, the memory comprising instructions that, when executed by one or more CPU cores in the multiple CPU cores, cause the computing system to;
    obtain multiple system call commands comprising commands that need to call a kernel function;
    classify the multiple system call commands according to task identifiers of the multiple system call commands, wherein system call commands of a same type have a same task identifier;
    obtain a call count of each system call command processed by a first CPU core in the multiple CPU cores, wherein the call count of each system call command is an execution count of each system call command in the computing system;
    determine a priority of each system call task according to the call count of each system call command processed by the first CPU core, wherein the first CPU core processes system call tasks of at least two different types, the system call tasks of the different types have different task identifiers, and each system call task comprises multiple system call commands that have a same task identifier; and
    send, according to a sequence of obtaining the multiple system call commands, system call commands of a same type to a same CPU core for processing, the send comprising:
        separately send in the send, according to a sequence of priorities based on the determined priority of each system call task, the system call tasks of the different types to the first CPU core for processing, wherein the multiple system call commands in each system call task are separately sent to the first CPU core according to an obtaining sequence.

6. The computing system according to claim 5, wherein the memory further comprises instructions that, when executed by the one or more CPU cores, cause the computing system to:
    allocate a CPU core to each type of system call command after the classifying the multiple system call commands;

obtain a first CPU core identifier of a system call command of a first type, wherein the first type is any type determined after the multiple system call commands are classified; and send, according to the first CPU core identifier, the system call command of the first type to the first CPU core for processing.

7. The computing system according to claim 6, wherein the memory further comprises instructions that, when executed by the one or more CPU cores, cause the computing system to:

obtain a first task identifier of the system call command of the first type;

determine that a task identifier of a second system call command is the same as the first task identifier, wherein the second system call command is any command of system call tasks that have been sent to the first CPU core for processing; and allocate the first CPU core to the system call command of the first type.

8. The computing system according to claim 5, wherein the memory is further configured to store a system call knowledge base, the system call knowledge base comprises the call count of each system call command processed by the computing system;

the memory further comprises instructions that, when executed by the one or more CPU cores, cause the computing system to:

obtain, according to a sum of 1 and the call count that is of each system call command processed by the first CPU core and that is recorded in the system call knowledge base, a current call count of each system call command processed by the first CPU core.

9. A non-transitory computer readable medium, for use in a multi-core system comprising multiple central processing unit (CPU) cores, comprising computer executable instructions stored on the non-transitory computer readable medium such that when executed by one or more CPU cores in the multi-core system, cause the multi-core system to:

obtain multiple system call commands, wherein the multiple system call commands are commands that need to call a kernel function;

classify the multiple system call commands according to task identifiers of the multiple system call commands, wherein system call commands of a same type have a same task identifier;

obtain a call count of each system call command processed by a first CPU core in the multiple CPU cores, wherein the call count of each system call command is an execution count of each system call command in the multi-core system;

determine a priority of each system call task according to the call count of each system call command processed by the first CPU core, wherein the first CPU core processes system call tasks of at least two different types, the system call tasks of the different types have different task identifiers, and each system call task comprises multiple system call commands that have a same task identifier; and send, according to a sequence of obtaining the multiple system call commands, system call commands of a same type to a same CPU core for processing, wherein the send comprising:

separately send, according to a sequence of priorities based on the determined priority of each system call task, the system call tasks of the different types to the first CPU core for processing, wherein the multiple system call commands in each system call task are separately sent to the first CPU core according to an obtaining sequence.

10. The non-transitory computer readable medium according to the claim 9, wherein the computer executable instructions cause the multi-core system to:

allocate a CPU core to each type of system call command after the classifying the multiple system call commands;

obtain a first CPU core identifier of a system call command of a first type, wherein the first type is any type determined after the multiple system call commands are classified; and send, according to the first CPU core identifier, the system call command of the first type to the first CPU core for processing.

11. The non-transitory computer readable medium according to the claim 10, wherein the computer executable instructions cause the multi-core system to:

obtain a first task identifier of the system call command of the first type;

determine that a task identifier of a second system call command is the same as the first task identifier, wherein the second system call command is any command of system call tasks that have been sent to the first CPU core for processing; and allocate the first CPU core to the system call command of the first type.

12. The non-transitory computer readable medium according to the claim 9, a system call knowledge base is stored in the multi-core system, and the system call knowledge base comprises the call count of each system call command processed by the multi-core system; and the computer executable instructions cause the multi-core system to:

obtain, according to a sum of 1 and the call count that is of each system call command processed by the first CPU core and that is recorded in the system call knowledge base, a current call count of each system call command processed by the first CPU core.

* * * * *